(12) United States Patent
Wodnicki et al.

(10) Patent No.: US 7,314,445 B2
(45) Date of Patent: Jan. 1, 2008

(54) INTEGRATED LOW-VOLTAGE TRANSMIT/RECEIVE SWITCH FOR ULTRASOUND IMAGING SYSTEM

(75) Inventors: Robert G. Wodnicki, Niskayuna, NY (US); Rayette A. Fisher, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 794 days.

(21) Appl. No.: 10/749,977

(22) Filed: Dec. 30, 2003

(65) Prior Publication Data

US 2005/0154300 A1 Jul. 14, 2005

(51) Int. Cl.
*A61B 8/00* (2006.01)
*H01L 41/00* (2006.01)

(52) U.S. Cl. ...................... 600/437; 310/317
(58) Field of Classification Search ........ 600/437–471; 73/625–626; 310/314–319
See application file for complete search history.

(56) References Cited

U.S. PATENT DOCUMENTS

| | | | |
|---|---|---|---|
| 5,603,324 A | | 2/1997 | Oppelt et al. .......... 128/660.01 |
| 5,740,806 A | * | 4/1998 | Miller ........................ 600/459 |
| 5,744,898 A | * | 4/1998 | Smith et al. ................. 310/334 |
| 6,380,766 B2 | * | 4/2002 | Savord ........................ 327/108 |
| 6,540,677 B1 | * | 4/2003 | Angelsen et al. ........... 600/437 |
| 6,540,682 B1 | * | 4/2003 | Leavitt et al. ............... 600/447 |
| 6,589,180 B2 | * | 7/2003 | Erikson et al. ............. 600/459 |
| 6,759,888 B1 | * | 7/2004 | Wodnicki .................... 327/382 |
| 6,856,175 B2 | * | 2/2005 | Wodnicki .................... 327/108 |
| 6,956,426 B2 | * | 10/2005 | Wodnicki .................... 327/382 |

* cited by examiner

*Primary Examiner*—Francis J. Jaworski
(74) *Attorney, Agent, or Firm*—Fletcher Yoder

(57) ABSTRACT

A low-voltage transmit/receive switch that acts to protect sensitive low-voltage electronics from high-voltage pulse signals used to drive an ultrasonic transducer. The low-voltage transmit/receive switch comprises a series resistor and a parallel MOSFET pair. The parallel MOSFETs are low-voltage devices. The low-voltage transmit/receive switch is placed between the output of a high-voltage pulser and the input of a receive pre-amplifier. If dual high- and low-voltage pulsers are used, then the low-voltage pulser is connected so that it is also protected from the high-voltage pulse signals by the low-voltage transmit/receive switch. In an alternative embodiment, the low-voltage pulser and the receive pre-amplifier are protected from the high-voltage pulse signals by a high-voltage transmit/receive switch.

25 Claims, 4 Drawing Sheets

INTEGRATED LOW-VOLTAGE TRANSMIT/RECEIVE SWITCH FOR ULTRASOUND IMAGING SYSTEM

BACKGROUND OF THE INVENTION

This invention generally relates to integrated circuitry for use in conjunction with ultrasonic transducer elements. In particular, the invention relates to transmit/receive switches for protecting sensitive low-voltage receive electronics from pulses generated by high-voltage transmit electronics in ultrasound imaging systems.

A medical ultrasound imaging system forms an image by acquiring individual ultrasound lines (or beams). The lines are adjacent to each other and cover the target area to be imaged. Each line is formed by transmitting an ultrasonic pulse in a particular spatial direction and receiving the reflected echoes from that direction. The spatial characteristics of the transmitted wave and the characteristics of the receive sensitivity determine the quality of the ultrasound image. It is desirable that the ultrasound line gathers target information only from the intended direction and ignores targets at other directions.

Conventional ultrasound imaging systems comprise an array of ultrasonic transducer elements that are used to transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves that combine to form a net ultrasonic wave that travels along a preferred vector direction and is focused in a selected zone along the beam.

The same principles apply when the transducer probe is employed to receive the reflected sound in a receive mode. The voltages produced at the receiving transducer elements are summed so that the net signal is indicative of the ultrasound reflected from a single focal zone in the object. As with the transmission mode, this focused reception of the ultrasonic energy is achieved by imparting separate time delay (and/or phase shifts) and gains to the signal from each receiving transducer element. The time delays are adjusted with increasing depth of the returned signal to provide dynamic focusing on receive.

The quality or resolution of the image formed is partly a function of the number of transducer elements that respectively constitute the transmit and receive apertures of the transducer array. Accordingly, to achieve high image quality, a large number of transducer elements is desirable for both two- and three-dimensional imaging applications. The ultrasonic transducer elements are typically located in a hand-held transducer probe that is connected by a flexible cable to an electronics unit that processes the transducer signals and generates ultrasound images. The transducer probe may carry both ultrasound transmit circuitry and ultrasound receive circuitry.

It is known to include high-voltage components in the transmit circuitry to drive the individual ultrasonic transducer elements, while low-voltage, high-density digital logic circuitry is used to provide transmit signals to the high-voltage drivers. The high-voltage drivers typically operate at voltages of up to approximately 100 volts, while the low-voltage logic circuitry has an operating voltage on the order of 5 volts in the case of TTL logic. The high-voltage drivers may be fabricated as discrete components or as integrated circuits, while the low-voltage logic circuitry may be fabricated as a separate integrated circuit or combined with the high-voltage circuitry on a single chip. In addition to transmit circuitry including the high-voltage drivers and low-voltage logic circuitry, the transducer head may include low-noise, low-voltage analog receive circuitry. The low-voltage receive circuitry, like the transmit logic circuitry, typically has an operating voltage on the order of 5 volts, and may be a separate integrated circuit or may be fabricated with the low-voltage transmit logic circuitry as a monolithic integrated circuit.

Typically, a transmit/receive switch is placed between the output-stage transistors and the transducer element. The transmit/receive switch is also connected to the low-voltage receive circuit. The transmit/receive switch has two states. In the transmit state, the transmit/receive switch connects the output-stage transistors to the ultrasonic transducer element, while isolating the receive circuit from the high-voltage transmit pulse. In the receive state, the transmit/receive switch isolates the output-stage transistors from the ultrasonic transducer element and instead connects the receive circuit to the transducer element.

In order to maximize the number of transducer elements to achieve high-quality ultrasound images, it is desirable to integrate as much circuitry as possible in as small a volume as possible to reduce the size and complexity of the circuitry, whether the circuitry be located within a transducer probe or in an electronics unit separate therefrom. In addition, some applications, for example, very high-frequency ultrasound imaging, require that transmit circuitry be located as close as possible to the transducer elements to avoid signal loading by a long cable. Therefore it has been proposed to integrate the aforementioned high-voltage drivers with either or both of the low-voltage transmit logic circuitry and the low-voltage receive circuitry as a monolithic integrated circuit.

There is a need for a low-voltage transmit/receive switch that acts to protect sensitive low-voltage electronics from high-voltage pulse signals used to drive an ultrasonic transducer. Further, in a portable ultrasound system, this circuit should be power efficient and easy to incorporate into an integrated circuit.

BRIEF DESCRIPTION OF THE INVENTION

The invention is directed in part to a low-voltage transmit/receive switch that acts to protect sensitive low-voltage electronics from high-voltage pulse signals used to drive an ultrasonic transducer. In one embodiment, the low-voltage transmit/receive switch comprises a series resistor and a parallel MOSFET pair. The parallel MOSFETs are low-voltage devices. The low-voltage transmit/receive switch is placed between the output of a high-voltage pulser and the input of a receive pre-amplifier. If dual high- and low-voltage pulsers are used, then the low-voltage pulser is connected so that it is also protected from the high-voltage pulse signals by the low-voltage transmit/receive switch. In an alternative embodiment, the low-voltage pulser and the receive pre-amplifier are protected from the high-voltage pulse signals by a high-voltage transmit/receive switch.

One aspect of the invention is a device comprising an ultrasonic transducer element and an integrated circuit which, in turn, comprises a high-voltage pulser for driving the ultrasonic transducer element with high-voltage transmit pulse signals, an amplifier for receiving a receive signal from the ultrasonic transducer element, and a low-voltage transmit/receive switch having first and second switch states. The amplifier is protected from the high-voltage transmit pulse signals by the low-voltage transmit/receive switch in the first switch state and is not protected when the low-voltage transmit/receive switch is in the second switch state.

Another aspect of the invention is a device comprising a multiplicity of ultrasonic transducer elements and a multiplicity of integrated circuits respectively electrically coupled to the ultrasonic transducer elements, wherein each of the integrated circuits comprises a high-voltage pulser for driving a respective ultrasonic transducer element with high-voltage transmit pulse signals, an amplifier for receiving a receive signal from a respective ultrasonic transducer element, and a low-voltage transmit/receive switch having first and second switch states. The amplifier is protected from the high-voltage transmit pulse signals by the low-voltage transmit/receive switch in the first switch state and is not protected when the low-voltage transmit/receive switch is in the second switch state.

A further aspect of the invention is a device comprising an ultrasonic transducer element and an integrated circuit that comprises a high-voltage pulser for driving the ultrasonic transducer element with high-voltage transmit pulse signals during a first phase of operation, a low-voltage pulser for driving the ultrasonic transducer element with low-voltage transmit pulse signals during a second phase of operation, an amplifier for receiving a receive signal from the ultrasonic transducer element, and a low-voltage transmit/receive switch having first and second switch states. Both the amplifier and the low-voltage pulser are protected from the high-voltage transmit pulse signals during the first phase of operation by the low-voltage transmit/receive switch in the first switch state and are not protected when the low-voltage transmit/receive switch is in the second switch state.

Yet another aspect of the invention is a device comprising an ultrasonic transducer element and an integrated circuit that comprises a high-voltage pulser for driving the ultrasonic transducer element with high-voltage transmit pulse signals during a first phase of operation, a low-voltage pulser for driving the ultrasonic transducer element with low-voltage transmit pulse signals during a second phase of operation, an amplifier for receiving a receive signal from the ultrasonic transducer element, and a transmit/receive switch having first and second switch states. Both the amplifier and the low-voltage pulser are protected from the high-voltage transmit pulse signals during the first phase of operation by the transmit/receive switch in the first switch state and are not protected when the transmit/receive switch is in the second switch state.

Another aspect of the invention is a device comprising an ultrasonic transducer element, a first junction, a high-voltage pulser having an output coupled to the ultrasonic transducer element through the first junction, a second junction, a resistor located to provide a voltage drop between the first and second junctions, an amplifier having an input coupled to the ultrasonic transducer element through the first and second junctions and the resistor, and first and second transistors connected in parallel between the second junction and a bias voltage that will not damage the amplifier.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
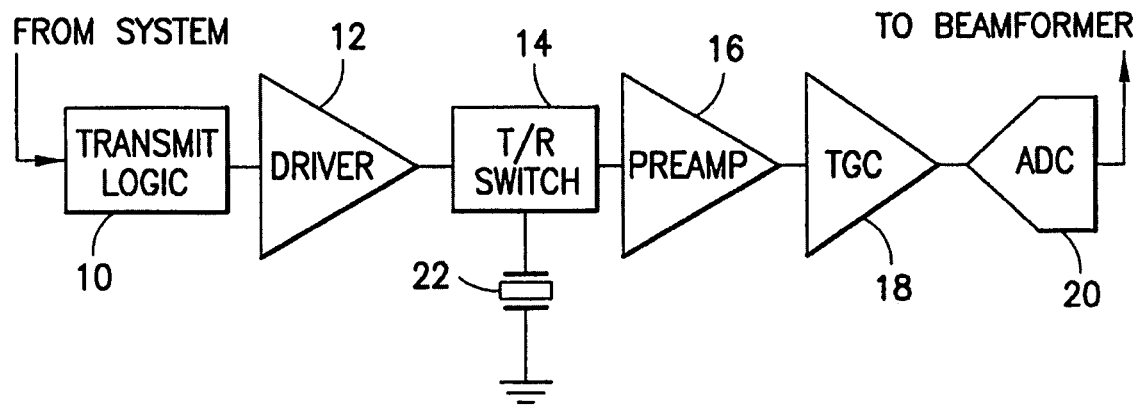
FIG. 1 is a schematic diagram showing conventional ultrasonic transducer array interface electronics.

The signal chain for conventional transmit and receive electronics for one ultrasonic transducer element is shown in FIG. 1. The transmit logic 10 is a digital circuit that creates a waveform to drive the transducer array element. In the transmit mode, the output of the transmit logic 10 is used to control a driver (i.e., pulser) 12 that buffers the signal and provides the necessary bias to the transducer element 22. In order to protect the receive electronics from the transmit voltage, a transmit/receive (T/R) switch 14 is used. In the receive mode, the transducer array is configured to detect the reflected ultrasound echoes. A sensitive low-noise pre-amplifier 16 is used to boost the signal by 20 dB or more. Following the pre-amplifier, a time gain control (TGC) amplifier 18 compresses the overall 120-dB dynamic range to an instantaneous range of 70 dB and accounts for logarithmic attenuation of ultrasound in the body. The output of the TGC amplifier 18 is filtered to prevent aliasing and then digitized by an analog-to-digital converter (ADC) 20. The output of each channel is sent to the beamformer (not shown in FIG. 1), where the data from the entire array is processed to form an image.

Figure 2:
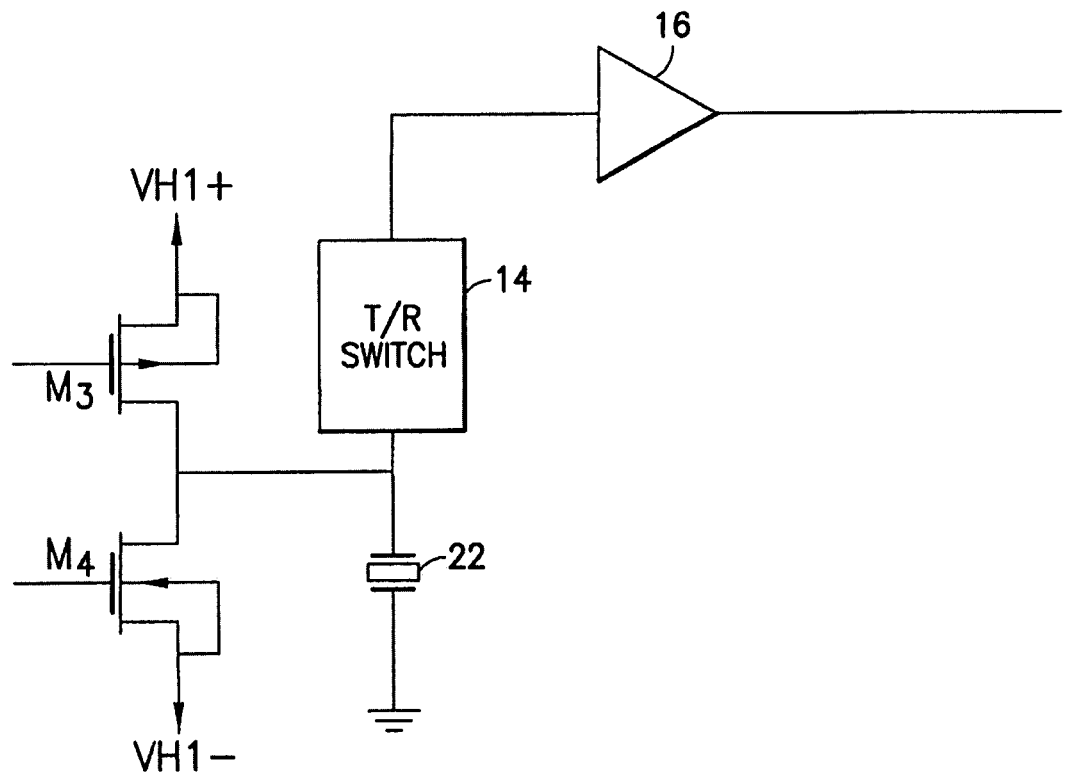
FIG. 2 is a schematic diagram showing a conventional ultrasound transmitter configuration with a transmit/receive switch for protecting a receive pre-amplifier.

Typically, the driver circuit comprises a high-voltage high-current output stage that is controlled by a low-current intermediate stage. For example, as shown in FIG. 2, the output stage may comprise a PMOS transistor $M_3$ and an NMOS transistor $M_4$ having their drains connected. The intermediate stage (not shown in FIG. 2) typically drives the gates of the output transistors 5 to 10 V greater (NMOS) or less than (PMOS) the high-voltage supply VH1+. The rise time is directly related to the transistor-ON resistance when driving the ultrasonic transducer, which is principally a capacitive load. This is because the transistor-ON resistance sets the maximum drive current that is used to drive the transducer capacitance directly. The transistor-ON resistance in turn is a function of the gate-source voltage (as well as other parameters).

Each element 22 in an ultrasonic transducer array can be driven by a respective driver or pulser circuit having the configuration shown in FIG. 2. The ultrasonic transducer element 22 is driven by the voltage $V_{out}$ output from a junction connecting the drain of the PMOS transistor $M_3$ to the drain of the NMOS transistor $M_4$. The source of PMOS transistor $M_3$ is connected to a terminal at potential VH1+, while the source of NMOS transistor 14 is connected to a terminal at potential VH1−. The gate of PMOS transistor $M_3$ has a control signal voltage $V_P$ applied thereto, while the gate of NMOS transistor $M_4$ has a control signal voltage $V_N$ applied thereto. For example, the gates of the output transistors $M_3$ and $M_4$ may be respectively driven 5 V less than the high-voltage supply VH1+ and 5 V greater than the low-voltage supply VH1−. When the control voltage $V_P$ input to the gate of transistor $M_3$ falls by 5 V, then the transistor $M_3$ is turned on and $V_{out}$ to the ultrasonic transducer element rises from 0 to VH1+. Later when the control voltage $V_N$ input to the gate of transistor $M_4$ rises to 5 V, the transistor $M_4$ is turned on and the voltage level $V_{out}$ to the ultrasonic transducer element falls from VH1+ to VH1−.

The sensitive low-voltage receive electronics, including pre-amplifier 16 in FIG. 2 are protected from the high-voltage pulse signals used to drive the ultrasonic transducer 22 by a transmit/receive switch 14. It is known in the prior art to use two-terminal discrete diodes to protect the low-voltage receive electronics. It is also known to place an FET in series with the transducer and the transmitter. See, e.g., U.S. Pat. No. 5,603,324.

Figure 3:
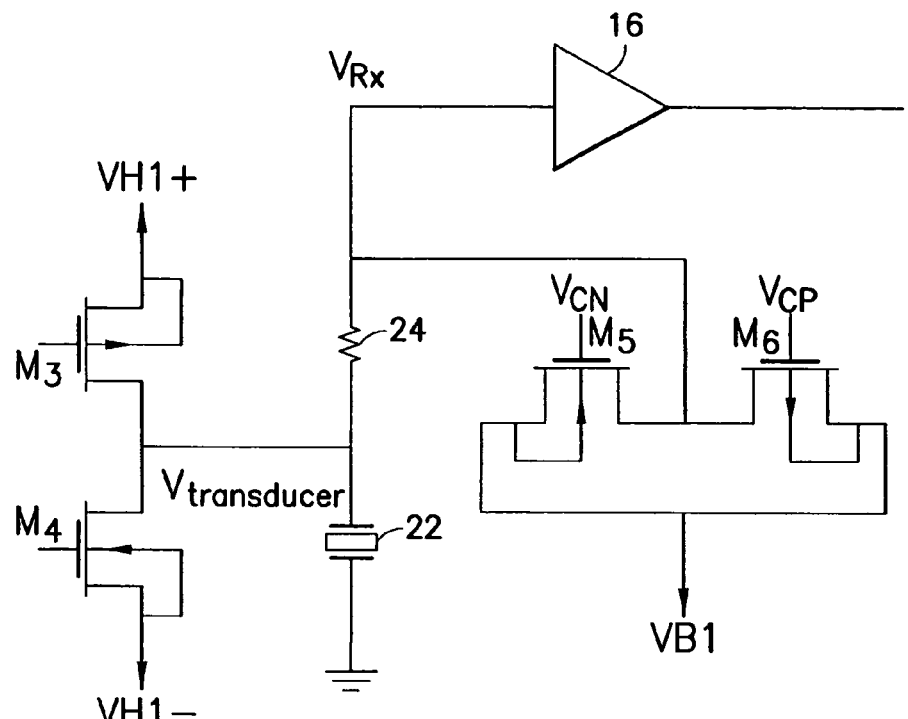
FIG. 3 is a schematic diagram showing a circuit that includes a transmit/receive switch formed by a pair of low-voltage FETs and a resistor in accordance with one embodiment of the invention.

In accordance with one embodiment of the present invention shown in FIG. 3, the transmit/receive switch comprises a series resistor 24 and a parallel FET pair. The parallel FETs are low-voltage devices. With reference to FIG. 3, $M_3$ and $M_4$ are the high-voltage pulser output pair; $M_5$ and $M_6$ are low-voltage MOSFETs with 500-ohm ON resistance. As seen in FIG. 3, the drains of the low-voltage MOSFETs $M_5/M_6$ are connected to a first junction, which in turn is connected by a conductor to a second junction located on the conductor connecting the resistor 24 to the input to the pre-amplifier 16. The other terminal of the resistor 24 is connected to a junction located on the conductor connecting the output of the high-voltage pulser output pair $M_3/M_4$ to the transducer 22. The sources of the low-voltage MOSFETs $M_5/M_6$ are connected to a junction that is at voltage level VB1, which is a bias voltage.

Figure 4:
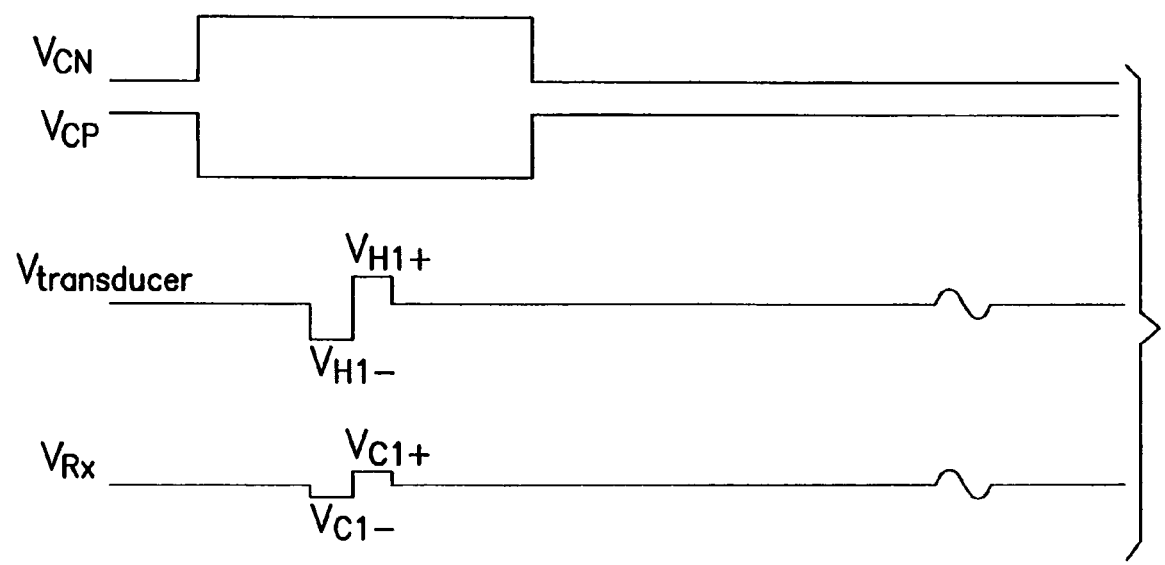
FIG. 4 is a graph showing the operating waveforms for the low-voltage transmit/receive switch depicted in FIG. 3.

When the pulser $M_3/M_4$ is operating (i.e., during the transmit phase), the low-voltage transistor pair $M_5/M_6$ is turned on. As seen in FIG. 4, in this example the low-voltage transistor pair $M_5/M_6$ is turned on when the digital control signals $V_{CN}$ and $V_{CP}$ are respectively high and low. This forces $V_{Rx}$ (the voltage input to the pre-amplifier 16) to a reduced voltage through the voltage divider formed by the resistor 24 and the low-voltage MOSFETs $M_5/M_6$. More specifically, when the voltage $V_{transducer}$ (the voltage to the ultrasonic transducer 22 in FIG. 3) is VH1−, the voltage $V_{Rx}$ is VC1−, while when the voltage $V_{transducer}$ is VH1+, the voltage $V_{Rx}$ is VC1+.

The following conditions are assumed for the purpose of illustration: (1) VH1+=50 V; (2) the impedance of the resistor 24 is 3.5 kilo-ohms; (3) the impedance of the transducer at the operating frequency of interest is 100 ohms; and (4) the ON resistance of the low-voltage MOSFETs $M_5/M_6$ is 500 ohms. In that case, then $V_{Rx}$=50 V×500/(3500+500)=50 V×500/4000=50 V×⅛=6.25 V. Similarly, when VH1−=−50 V, $V_{Rx}$=−6.25 V. Therefore, the transmit/receive switching circuit shown in FIG. 3 effectively reduces the high voltage (±50 V) to a low voltage (±6.25 V) to protect the pre-amplifier receive electronics. The pulser will see the transducer impedance in parallel with the resistors=100×4000/(100+4000)=97.6 ohms. The load will be somewhat more resistive, but will only dissipate about $50^2/4000$=625 mW×1%=6.25 mW in the resistor/MOSFET combination at the low pulser duty cycle. This is much less than the loss incurred with a prior art diode-based transmit/receive switch that is constantly turned on.

During the receive phase, the low-voltage MOSFETs $M_5/M_6$ are both turned off. In that case there is a 3.5-kΩ resistor in series with the input to the pre-amplifier 16. For a high-impedance pre-amplifier, this does not reduce the input signal appreciably. Voltage noise on the order of about 30 ì V rms is added (for a bandwidth of 15 MHz). A smaller resistor could be used to reduce the added noise at the expense of increased power dissipation.

The bias voltage VB1 is nominally 0 V or ground or analog ground. In some systems it may be advantageous to choose an analog ground level that is not the same as the system ground level. For example, system ground may be 0 V while analog ground is 2.5 V. In this case, VB1 could be 2.5 V instead. In general, VB1 is a voltage that does not damage the pre-amplifier 16 and still allows the high input voltage to be divided properly to prevent the transmit pulse from damaging the pre-amplifier 16.

For the purposes of this disclosure, "low voltage" means any voltage level that is readily implemented in widely available "standard" semiconductor processes. This could be anywhere from 2.5 to 5 V (for CMOS) up to 25 to 30 V (for BiCMOS). In contrast, "high voltage" means voltage levels that are only accessible if more specialized semiconductor processes and device structures are used (e.g., DMOSFETs, silicon on insulator (SOI), trench isolation, etc.) Therefore any voltage level from about 30 V up to as high as 500 V should be considered to be "high voltage". Naturally, the present invention will only work to protect the low-voltage devices if the divider is great enough to reduce the high voltage to something that the low-voltage devices can tolerate.

The transmit/receive switch shown in FIG. 3 has the following important features: (1) It does not use diodes, which are difficult to integrate and consume a considerable amount of power (in static bias operation). (2) It uses a resistor to drop the high voltage and protect the low-voltage receive circuitry. (3) It uses low-voltage MOSFETs that act as selectively enabled resistors to help drop the high voltage. (4) It can be easily integrated onto an integrated circuit due to the use of readily available device structures (resistors and low-voltage MOSFETs). (5) It consumes minimal power since the switch does not need to be continuously biased. (6) It uses both an NMOS and a PMOS transistor to ensure that the circuit can operate properly for bipolar (e.g., ±50 V) transmit pulses.

In a portable cardiac-capable ultrasound imaging system, circuitry is required to allow fast switching between low- and high-voltage pulse modes. In the high-voltage mode, it is necessary to protect the sensitive low-voltage receive electronics from pulses generated by the high-voltage transmit electronics. Further, in a portable ultrasound system, this circuit should be power efficient and easy to incorporate into an integrated circuit.

Figure 5:
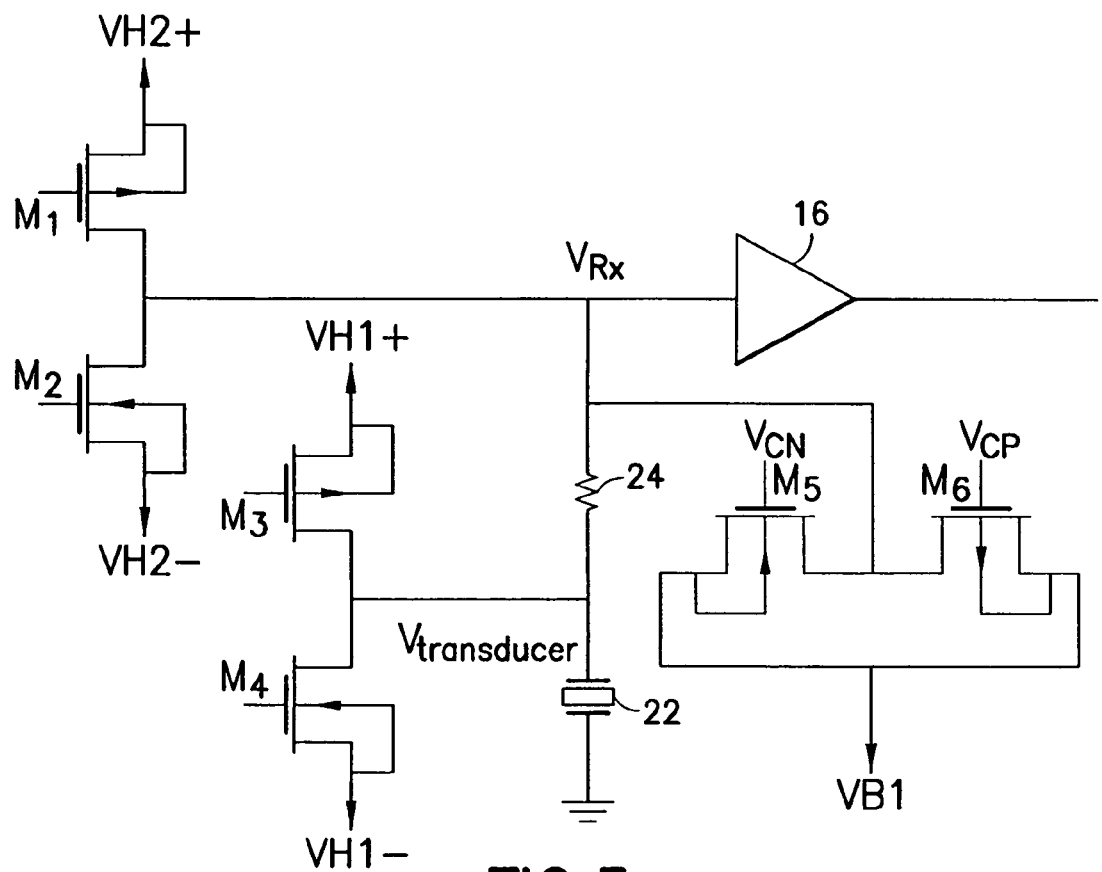
FIG. 5 is a schematic diagram showing a circuit that includes a dual pulser with a transmit/receive switch of the type depicted in FIG. 3 for protecting the receive amplifier and the low-voltage pulser in accordance with another embodiment of the invention.

In accordance with another embodiment of the invention, the resistor-based transmit/receive switch shown in FIG. 3 can be combined with a dual pulser, as shown in FIG. 5. This combination can be easily implemented in an integrated circuit. Small low-current, low-voltage transistors can be used to form the low-voltage pulser since it does not have to tolerate high voltage. This saves area on the chip and reduces the cost.

Referring to FIG. 5, transistors $M_3$ and $M_4$ form the high-voltage pulser output pair, while transistors $M_1$ and $M_2$ form the low-voltage pulser output pair. The two pulsers operate in conjunction to drive the same channel. During one phase of operation, only the low-voltage pulser is used, whereas in a second phase of operation, only the high-voltage pulser is used. The low-voltage pulser needs to be protected during the phase when the high-voltage pulser is being used. Such protection is provided by transistors $M_5$ and $M_6$ in combination with resistor 24, which form a low-voltage transmit/receive switch. Since the low-voltage pulser transistors $M_1$ and $M_2$ are connected after the transmit/receive switch, they are protected from the high-voltage pulser just as the pre-amplifier 16 is. Additionally, depending on the implementation, it may be possible to use the low-voltage pulser pair $M_1$ and $M_2$ in place of the transmit/receive switch pair $M_5$ and $M_6$. These transistors would then have a dual function, and area and expense savings would be realized.

Figure 6:
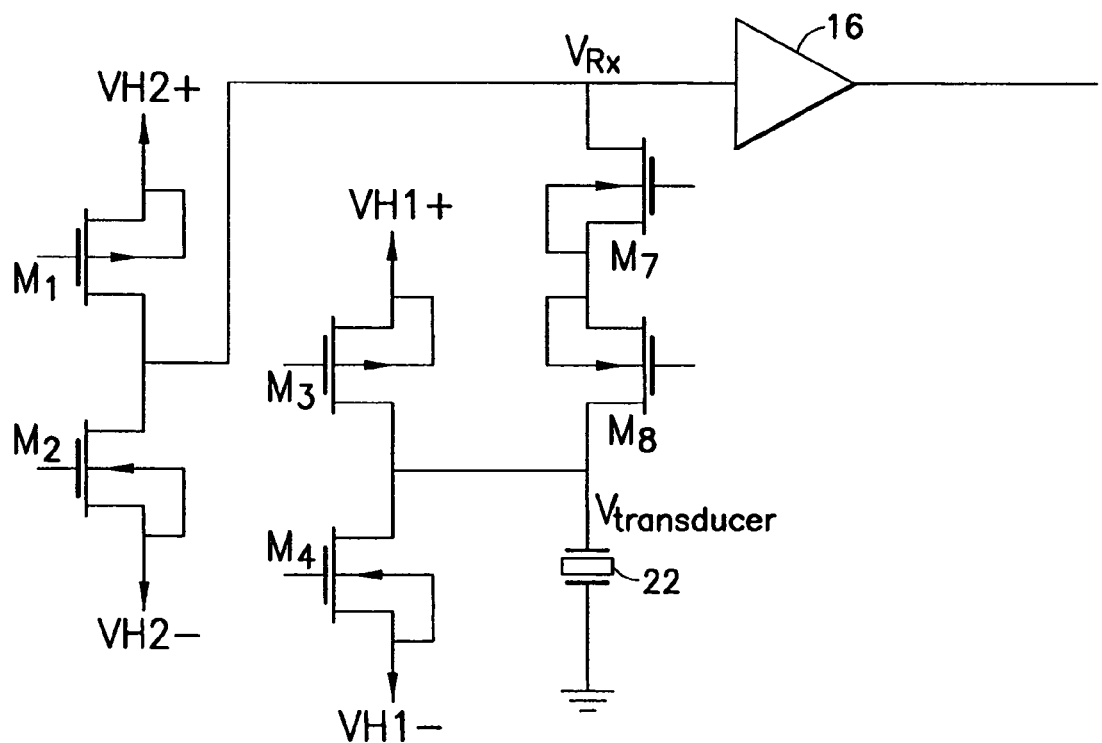
FIG. 6 is a schematic diagram showing a circuit that includes a dual pulser with an FET-based transmit/receive switch for protecting the receive amplifier and the low-voltage pulser in accordance with a further embodiment of the invention.

In accordance with a further embodiment, other (including prior art) types of transmit/receive switches could be used to protect both the pre-amplifier of the receive electronics and the low-voltage output pair of the dual pulser. FIG. 6 shows an integrated circuit comprising a dual pulser with an FET-based transmit/receive switch. Again, transistors $M_3$ and $M_4$ form the high-voltage pulser output pair, while transistors $M_1$ and $M_2$ form the low-voltage pulser output pair. Transistors $M_7$ and $M_8$ form a high-voltage transmit/receive switch. The sources of transistors $M_7$ and $M_8$ are connected to each other; the drain of transistor $M_7$ is connected to a junction located on the conductor that connects the output of the low-voltage pulser pair $M_1$ and $M_2$ to the input of the pre-amplifier 16, and the drain of transistor $M_8$ is connected to a junction located on the conductor that connects the output of the high-voltage pulser pair $M_3$ and $M_4$ to the ultrasonic transducer 22. The use of a high-voltage transmit/receive switch, instead of the low-voltage transmit/receive switch shown in FIG. 5, increases the size of the transmit/receive switch.

Figure 7:
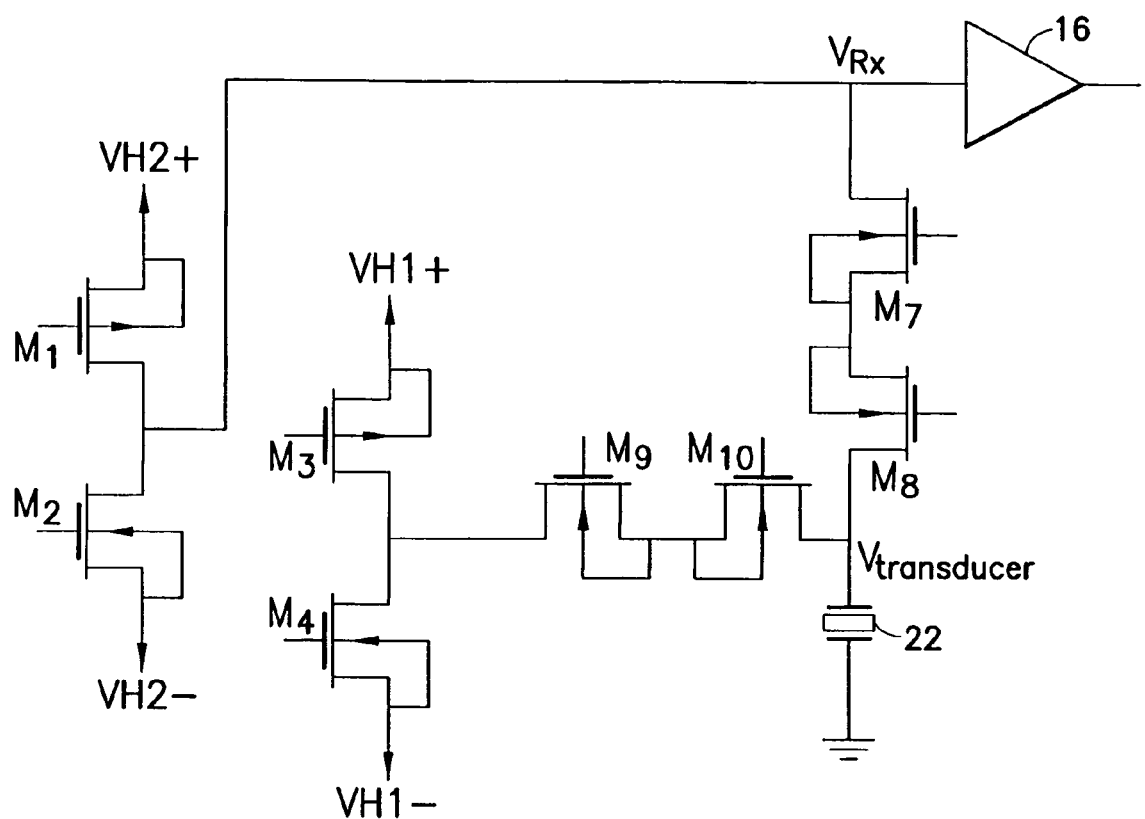
FIG. 7 is a schematic diagram showing a circuit that includes a dual pulser with reduced receive loading in accordance with yet another embodiment of the invention.

The embodiment shown in FIG. 6 may be modified as shown in FIG. 7 by adding a switch between the high-voltage pulser and the transducer. [The embodiments shown in FIGS. 3 and 5 may be similarly modified.] This switch is used to isolate the high-voltage pulser from the transducer during receive to reduce receive loading. The switch consists of a pair of transistors $M_9$ and $M_{10}$. The sources of transistors $M_9$ and $M_{10}$ are connected to each other; the drain of transistor $M_9$ is connected to the output of the high-voltage pulser pair $M_3$ and $M_4$, and the drain of the transistor $M_{10}$ is connected to a junction located on the conductor that connects the drain of transistor $M_8$ to the ultrasonic transducer 22.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. A device comprising an ultrasonic transducer element and an integrated circuit, said integrated circuit comprising a high-voltage pulser including a high-voltage transmit/receive switch, for driving said ultrasonic transducer element with high-voltage transmit pulse signals, an amplifier for receiving a receive signal from said ultrasonic transducer element, and a low-voltage transmit/receive switch having first and second switch states, said low-voltage transmit/receive switch being electrically coupled between said high-voltage pulser and said amplifier, said amplifier being protected from said high-voltage transmit pulse signals by said low-voltage transmit/receive switch in said first switch state and being not protected when said low-voltage transmit/receive switch is in said second switch state.

2. The device as recited in claim 1, further comprising first and second junctions, an output of said high-voltage pulser being electrically coupled to said ultrasonic transducer element through said first junction, and an input of said amplifier being electrically coupled to said ultrasonic transducer element through said first and second junctions, wherein said low-voltage transmit/receive switch comprises:
   a resistor connected to provide a resistance between said first and second junctions; and
   first and second transistors connected in parallel between said second junction and a bias voltage that will not damage said amplifier.

3. The device as recited in claim 2, wherein the sources of said first and second transistors are connected to a third junction, said third junction being substantially at said bias voltage, and the drains of said first and second transistors are connected to a fourth junction, said fourth junction being electrically coupled to said resistor through said second junction.

4. The device as recited in claim 3, wherein said first transistor is an NMOS transistor and said second transistor is a PMOS transistor.

5. The device as recited in claim 2, wherein the resistance of said resistor is large enough to reduce the voltage output by said high-voltage pulser to a level that will not damage said amplifier.

6. The device as recited in claim 2, further comprising a low-voltage pulser having an output electrically coupled to said input of said amplifier through a third junction located along the current pathway by which said input of said amplifier is electrically coupled to said second junction.

7. The device as recited in claim 2, further comprising a switch between said high-voltage pulser and said first junction for isolating said high-voltage pulser during receive.

8. The device as recited in claim 1, wherein said high-voltage pulser comprises first and second transistors having their respective drains connected to each other at said output of said high-voltage pulser.

9. A device comprising a multiplicity of ultrasonic transducer elements and a multiplicity of integrated circuits, each integrated circuit being electrically coupled to a respective ultrasonic transducer element, wherein each of said integrated circuits comprises a high-voltage pulser including a high voltage switch, for driving a respective ultrasonic transducer element with high-voltage transmit pulse signals, an amplifier for receiving a receive signal from said ultrasonic transducer element, and a low-voltage transmit/receive switch having first and second switch states, said low-voltage transmit/receive switch being electrically coupled between said high-voltage pulser and said amplifier, said amplifier being protected from said high-voltage transmit pulse signals by said low-voltage transmit/receive switch in said first switch state and being not protected when said low-voltage transmit/receive switch is in said second switch state.

10. The device as recited in claim 9, wherein each integrated circuit further comprises first and second junctions, an output of said high-voltage pulser being electrically coupled to said ultrasonic transducer element through said first junction, and an input of said amplifier being electrically coupled to said ultrasonic transducer element through said first and second junctions, wherein said low-voltage transmit/receive switch comprises:

a resistor connected to provide a resistance between said first and second junctions; and first and second transistors connected in parallel between said second junction and a bias voltage that will not damage said amplifier.

11. The device as recited in claim 10, wherein the sources of said first and second transistors are connected to a third junction, said third junction being substantially at said bias voltage, and the drains of said first and second transistors are connected to a fourth junction, said fourth junction being electrically coupled to said resistor through said second junction.

12. The device as recited in claim 10, further comprising a low-voltage pulser having an output electrically coupled to said input of said amplifier through a third junction located along the current pathway by which said input of said amplifier is electrically coupled to said second junction.

13. A device comprising an ultrasonic transducer element and an integrated circuit, said integrated circuit comprising a high-voltage pulser including a high-voltage switch, for driving said ultrasonic transducer element with high-voltage transmit pulse signals during a first phase of operation, a low-voltage pulser for driving said ultrasonic transducer element with low-voltage transmit pulse signals during a second phase of operation, an amplifier for receiving a receive signal from said ultrasonic transducer element, and a low-voltage transmit/receive switch having first and second switch states, said low-voltage transmit/receive switch being electrically coupled between said high-voltage pulser and said amplifier, said amplifier and said low-voltage pulser being protected from said high-voltage transmit pulse signals during said first phase of operation by said low-voltage transmit/receive switch in said first switch state and being not protected when said low-voltage transmit/receive switch is in said second switch state.

14. The device as recited in claim 13, wherein said integrated circuit further comprises first and second junctions, an output of said high-voltage pulser being electrically coupled to said ultrasonic transducer element through said first junction, and an input of said amplifier being electrically coupled to said ultrasonic transducer element through said first and second junctions, wherein said low-voltage transmit/receive switch comprises:

a resistor connected to provide a resistance between said first and second junctions; and first and second transistors connected in parallel between said second junction and a bias voltage that will not damage said amplifier.

15. The device as recited in claim 14, wherein the sources of said first and second transistors are connected to a third junction, said third junction being substantially at said bias voltage, and the drains of said first and second transistors are connected to a fourth junction, said fourth junction being electrically coupled to said resistor through said second junction.

16. The device as recited in claim 14, wherein said low-voltage pulser has an output electrically coupled to said input of said amplifier through a third junction located along the current pathway by which said input of said amplifier is electrically coupled to said second junction.

17. The device as recited in claim 14, further comprising a switch between said high-voltage pulser and said first junction for isolating said high-voltage pulser during receive.

18. A device comprising an ultrasonic transducer element and an integrated circuit, said integrated circuit comprising a high-voltage pulser including a high-voltage transmit/receive switch, for driving said ultrasonic transducer element with high-voltage transmit pulse signals during a first phase of operation, a low-voltage pulser for driving said ultrasonic transducer element with low-voltage transmit pulse signals during a second phase of operation, an amplifier for receiving a receive signal from said ultrasonic transducer element, and a transmit/receive switch having first and second switch states, said low-voltage transmit/receive switch being electrically coupled between said high-voltage pulser and said amplifier, said amplifier and said low-voltage pulser being protected from said high-voltage transmit pulse signals during said first phase of operation by said transmit/receive switch in said first switch state and being not protected when said transmit/receive switch is in said second switch state.

19. The device as recited in claim 18, further comprising a switch between said high-voltage pulser and said ultrasonic transducer element for isolating said high-voltage pulser during receive.

20. The device as recited in claim 18, wherein said high- and low-voltage pulsers each comprise a respective pair of transistors having their drains connected, and said transmit/receive switch comprises a pair of transistors having their sources connected.

21. The device as recited in claim 20, wherein said integrated circuit further comprises first and second junctions, an output of said high-voltage pulser being electrically coupled to said ultrasonic transducer element through said first junction, and an input of said amplifier being electrically coupled to said ultrasonic transducer element through said first and second junctions, wherein the drain of one of said transistors of said transmit/receive switch is connected to said second junction and the drain of the other of said transistors of said transmit/receive switch is connected to said first junction.

22. A device comprising an ultrasonic transducer element, a first junction, a high-voltage pulser having an output coupled to said ultrasonic transducer element through said first junction, a second junction, a resistor located to provide a voltage drop between said first and second junctions, an amplifier having an input coupled to said ultrasonic transducer element through said first and second junctions and said resistor, and first and second transistors connected in parallel between said second junction and a bias voltage that will not damage said amplifier.

23. The device as recited in claim 22, further comprising third and fourth junctions, wherein said first and second transistors have their drains connected at said third junction and have their sources connected at said fourth junction, said fourth junction being at said bias voltage.

24. The device as recited in claim 22, wherein said high-voltage pulser comprises third and fourth transistors having their respective drains connected to each other at said output of said high-voltage pulser.

25. The device as recited in claim 24, further comprising a low-voltage pulser having an output coupled to said amplifier through said second junction, wherein said low-voltage pulser comprises fifth and sixth transistors having their respective drains connected to each other at said output of said low-voltage pulser.

* * * * *